(No Model.) 2 Sheets—Sheet 1.
M. B. BANOWETZ.
CORN OR COTTON STALK CUTTER.
No. 398,216. Patented Feb. 19, 1889.
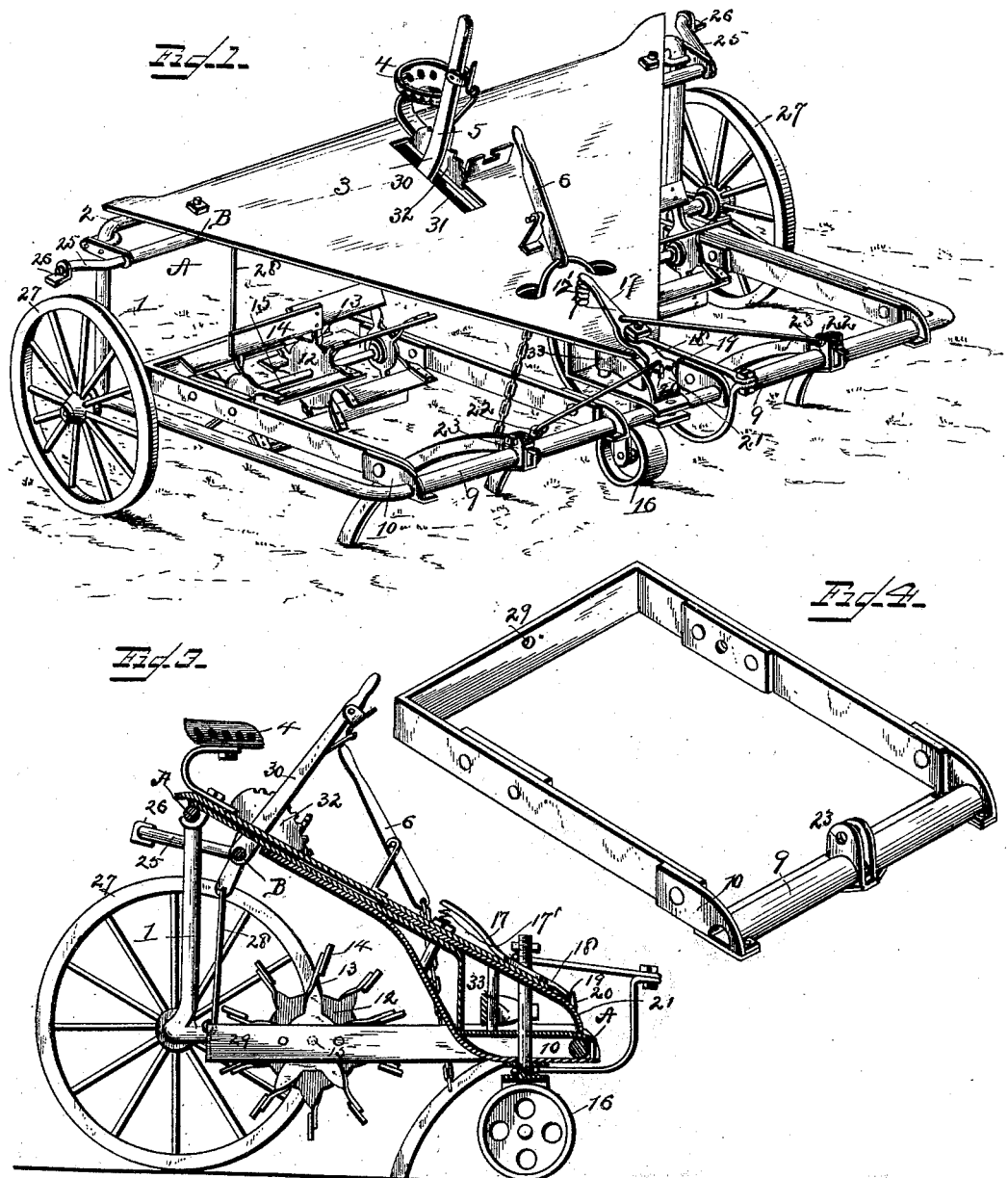

(No Model.) 2 Sheets—Sheet 2.
M. B. BANOWETZ.
CORN OR COTTON STALK CUTTER.
No. 398,216. Patented Feb. 19, 1889.
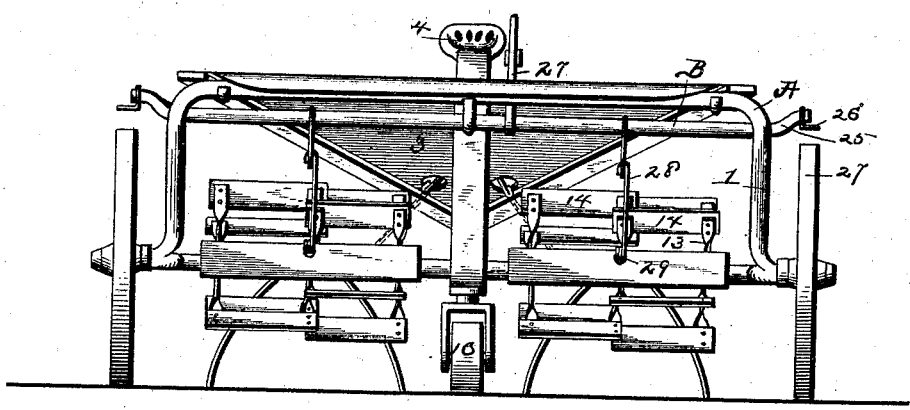
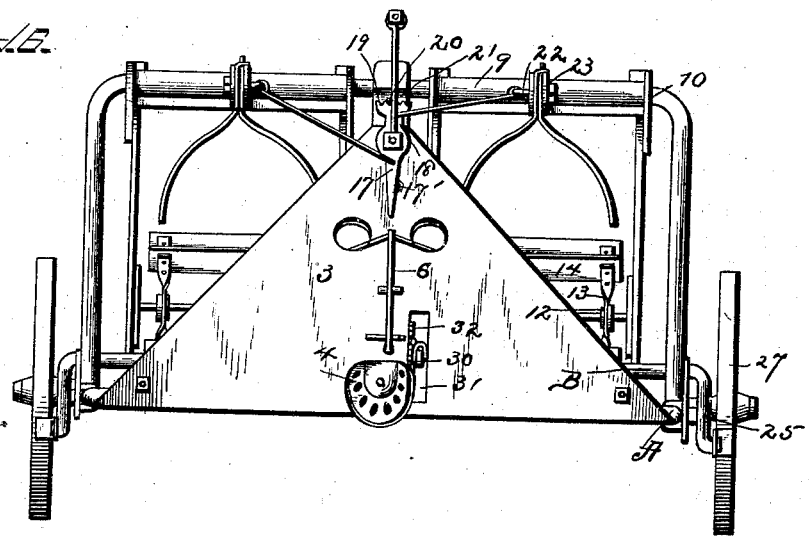
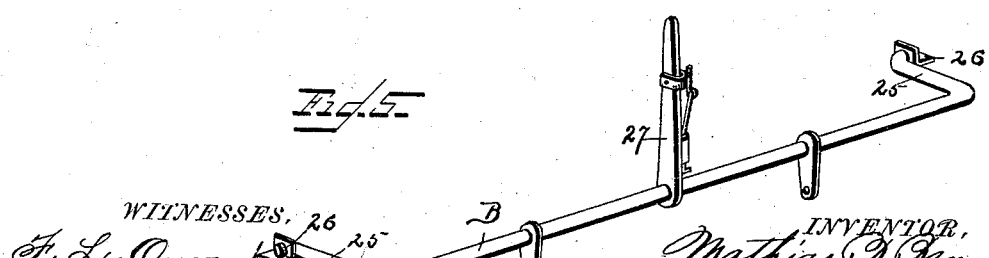
WITNESSES, INVENTOR,

UNITED STATES PATENT OFFICE.

MATHIAS BARTHOLOMEW BANOWETZ, OF BROWN'S STATION, IOWA.

CORN OR COTTON STALK CUTTER.

SPECIFICATION forming part of Letters Patent No. 398,216, dated February 19, 1889.

Application filed September 10, 1888. Serial No. 285,023. (No model.)

*To all whom it may concern:*

Be it known that I, MATHIAS BARTHOLOMEW BANOWETZ, a citizen of the United States, and a resident of Brown's Station, in the county of Clinton and State of Iowa, have invented certain new and useful Improvements in Corn or Cotton Stalk Cutters; and I do hereby declare that the following is a full, clear, and exact description of the invention, which will enable others skilled in the art to which it appertains to make and use the same.

This invention relates to corn or cotton stalk cutters.

The object is to produce a device which may be used either as a corn or cotton stalk cutter, and which shall be simple of construction, efficient and durable in use, and comparatively inexpensive of production.

With these objects in view the invention consists in the improved construction and combination of parts of a corn or cotton stalk cutter, as will be hereinafter fully described in the specification, illustrated in the drawings, and pointed out in the claims.

In the accompanying drawings, forming part of this specification, and in which like letters of reference indicate corresponding parts—

Figure 1 is a perspective view of my improved cutting device. Fig. 2 is a rear end view. Fig. 3 is a transverse sectional view of the device, showing the construction of certain parts of the mechanism. Fig. 4 is a detail view of one of the frames carrying the cutters, showing the construction of the same. Fig. 5 is a detail view of the arm for regulating the height of the cutters and also carrying the brakes for stopping the device; and Fig. 6 is a top plan view of the device, showing the seat and the arm for regulating the width of the cutters so as to make them cover a large or small surface.

Referring to the drawings, A designates the supporting-frame of the device, which may be made of any suitable material, but preferably in this instance of a metallic tubing—such as gas-pipe—having its sides 1 bent out, at which point suitable axles may be secured, either by welding or in any other suitable manner. Upon the top portion, 2, of this frame is secured a platform, 3, upon which is mounted the seat 4 for the driver, and the levers 5, 6, and 17 for operating certain parts of the mechanism, as will be described farther on.

Upon the front portion, 8, of the frame are loosely mounted two collars, 9, the ends of which are formed into two arms, 10, to which are secured the frame carrying the stalk-cutters. These stalk-cutters consist, essentially, of a hub, 12, having spokes 13, made integral therewith, to the outer end of which are secured the cutter-blades 14. It will be observed that each of the axles 15 secured in these frames has three of these hubs mounted upon it thus allowing two separate sets of blades to be attached to each of the cutters—that is, one blade being placed to the right and one to the left—so that instead of having a blade extending across the entire width of the cutter they are made shorter, so that there is a wider space between the cutter-blades. These frames carrying the cutter-blades are made to slide upon the front portion of the main frame A by means of the collars 9, so as to widen or narrow the cutting capacity of the cutters by drawing them in or pushing them out, as desired. In order to accomplish this result, the following mechanism is employed: To the stem of the shank of the guide-wheel 16, which extends up through the platform, is attached a lever, 17, and is held in position by a small spring, 17', the lower end, 18, of which is provided with a number of serrations or teeth, 19, adapted to engage a pin, 20, secured to the standard 21, in which the said guide-wheel moves. At points preferably above and below the pivotal point of this lever are secured two arms, which extend downward and are secured to a ring-bolt, 22, which engages an opening in the standard 23 on the movable collar 9. It will be readily seen that by turning this lever either to one side or the other the frames carrying the cutter-blades will be moved out, thus causing the cutter-blades to cover a larger surface or drawn in to cover a smaller surface, the lever being held in place by means of the serrations engaging the pin on the standard, as before described.

B designates a rod mounted in shoulders 24, secured to the upper portion of the frame A. The outer ends of this rod are bent out to form two arms, 25, carrying on their ends brake-shoes 26, which are designed to engage the periphery of the wheels 27. At a point near the center of this rod are secured two downwardly-extending arms, to which are attached two wires, 28, which pass down and engage openings 29 in the rear portion of the frame carrying the cutter-wheels. At a point, preferably at the center, is secured a lever, 30, which passes up through a slot, 31, in the platform 3, and is in easy reach of the driver when seated. This lever has a spring-actuated ratchet secured to it, which is adapted to engage the teeth on a ratchet-plate, 32, secured to the said platform. It will now be seen that by pushing this lever either forward or backward the cutter-blades may be elevated or depressed to any desired point, and, if desired, by drawing the lever back as far as possible the brake-shoes will be applied to the wheels, and thus serve to stop the device. It will thus be seen that this rod forms a combined brake-lever and cutter-knife-wheel regulator. Upon the shoulder formed upon the sliding collar 9 are secured two drags designed to force the stalks into the proper position to be operated upon by the knives. The height of the drags may be regulated by means of a lever, 6, secured to the platform 9, the said lever having chains secured to it, so that by raising or lowering it the drags may be moved in corresponding directions.

In order to hitch the horse to this device, a rod is secured to the shank of the guide-wheel at a point above and below the platform 3, and to this the doubletree of the harness may be attached. Thus the device may be termed a "corn or cotton stalk cutter."

In order to prevent the guide-wheel from being thrown from one side to the other by coming in contact with certain inequalities in the ground, the shank is flattened on two sides, and these sides are engaged by a spring, 33, which serves to hold the guide-wheel in the position requisite to cause the device to travel in a straight line.

It will thus be seen that although this device is exceedingly simple of construction it will be found highly efficient and durable in use, and may be constructed at comparatively a slight expense.

Having thus fully described my invention, what I claim as new, and desire to secure by Letters Patent, is—

1. In a stalk-cutter, the combination, with the main frame, the cutter-frames, the collars or sleeves 9, the stalk-cutters journaled in said frames, and each consisting of three hubs, 12, the spokes 13, and blades 14, and the mechanism, substantially as described, whereby the said cutter-frames and collars are moved laterally on the main frame, of the lever 30, journaled on the main frame, the shaft B, provided with the brake-shoes 26, the wires 28, connecting the arms of said shaft B with the rears of the cutter-frames, and the detent mechanism for said lever, constructed substantially as described, and situated upon the top of the main frame, as specified.

2. In a stalk-cutter, the combination, with the main frame, the cutter-frames, rendered adjustable laterally on the main frame by means of the collars 9, the lever 17, and rods connecting said lever and collars, and the vertically-adjustable drags secured to said collars, of the stalk-cutters, each consisting of the three hubs 12, the spokes 13, and blades 14, and having their shafts journaled in the corresponding cutter-frames, as specified.

3. In a stalk-cutter, the combination, with the guide-wheel having its shank or standard journaled in the front portion of the main frame and flattened on opposite sides between its bearings, of the springs 33, secured to the main frame and bearing on said flattened sides, substantially as and for the purpose specified.

In testimony that I claim the foregoing as my own I have hereunto affixed my signature in presence of two witnesses.

MATHIAS BARTHOLOMEW BANOWETZ.

Witnesses:
ALFRED W. NIEMANN,
LESLIE GARLAND.